Nov. 4, 1924.
D. M. DRISCOLL
NONSKID DEVICE
Filed July 29, 1922
1,513,751
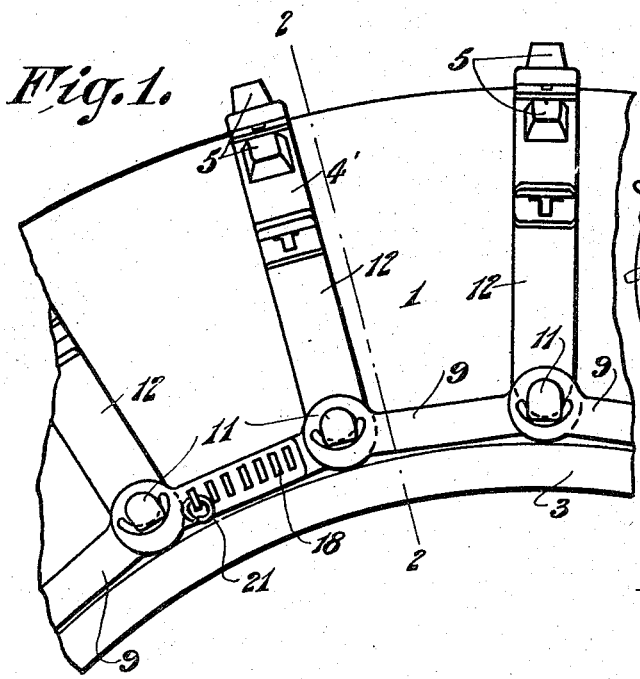
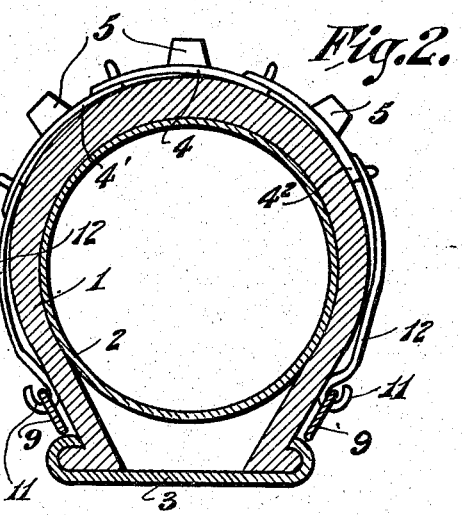
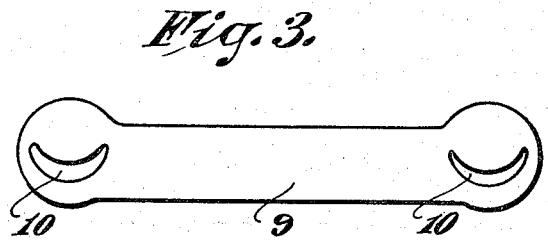
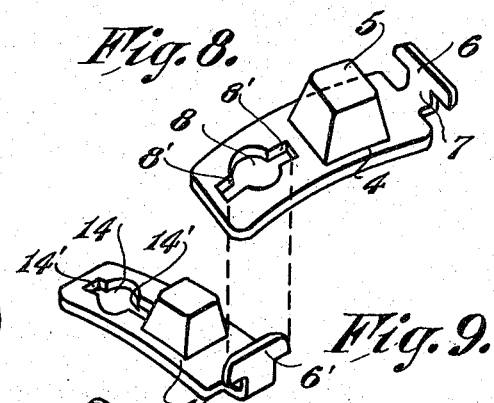
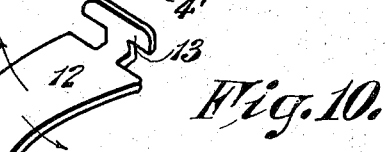
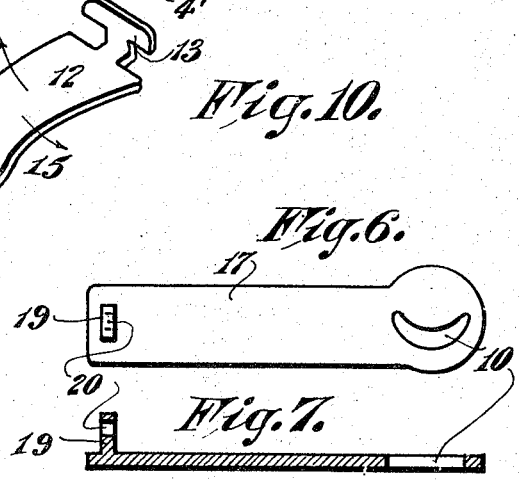
INVENTOR.
Daniel M. Driscoll.
BY
Harry W. Bowen.
ATTORNEY.

Patented Nov. 4, 1924.

1,513,751

UNITED STATES PATENT OFFICE.

DANIEL M. DRISCOLL, OF GREENFIELD, MASSACHUSETTS.

NONSKID DEVICE.

Application filed July 29, 1922. Serial No. 578,424.

*To all whom it may concern:*

Be it known that I, DANIEL M. DRISCOLL, a citizen of the United States of America, residing at Greenfield, county of Franklin, State of Massachusetts, have invented certain new and useful Improvements in Nonskid Devices, of which the following is a specification.

This invention relates to improvements in non-skid devices for motor vehicles.

It is designed to be used on either solid or pneumatic tires whereby the frictional grip or resistance of the tire against slipping will be prevented both laterally and circumferentially of the tread of the tire. In devices already on the market, of the chain type, it has been found that the links of the chain often break as they do not effectually prevent the wheels from skidding either laterally or circumferentially of the tread.

Broadly considered the present invention comprises a series of tread sections or links that may be readily connected and disconnected with each other and located over the tread portion of the tire; each of the links being formed with an outwardly extending projection or lug which is substantially the shape of a pyramid with apex removed.

The device further comprises means for readily adjusting the tread sections or links to the diameter of the wheel, whereby the device may be applied to wheels of different diameters or to wheels having tires of different sizes.

Further objects and nature of the invention will appear in the body of the specification and will be particularly pointed out in the claims.

Referring to the drawings:

Fig. 1 is a partial side elevational view showing two of the tread sections or links assembled and the circumferentially arranged means for securing the links to the tire including the adjusting and locking devices for the same.

Fig. 2 is a transverse sectional view on the line 2—2 of Fig. 1 showing the projections as they appear when in use.

Fig. 3 is a detail view of one of the side securing links.

Figs. 4 and 5 are a plan and sectional view, respectively, of the adjustable link.

Figs. 6 and 7 are a plan and sectional view respectively of the complemental securing link having a projection which engages one of the perforations of the link shown in Figs. 4 and 5.

Figs. 8 and 9 show two of the sections, or tread portions, of the device and the dotted line connections illustrates the manner of assembling these sections, and Fig. 10 is a view of one of the links which connects the tread sections to the series of links arranged on the side of the tire.

Referring to the drawings in detail:

1 designates a section of a pneumatic tire although it is to be understood that a solid tire may be employed. 2 designates the inner tube, 3 the metal rim which receives the base portion of the tire. 4 designates one of the tread sections or links that is arranged laterally of the tread portion of the tire. Each of these sections is formed with a projection 5 substantially the shape of a pyramid with the apex portion removed. 6 designates a laterally arranged bar portion at one end and having a connecting neck 7 between the main portion 4 and the bar. Located at the opposite end of this section is the cut-out or opening 8 having the longitudinally extending recesses 8' which receives the bar portion 6' of the complemental link 4'. When the bar portion 6' is passed through the opening 8 it is given a lateral rotation of 90°, whereby the bar is arranged transversely of the length of the link as clearly shown in Figs. 1 and 2 showing three of the tread sections assembled when in use. The neck part 7 will turn in the opening 8 during the assembling.

For the purpose of retaining the sections 4, 4', and 4² in place on the tread of the tire there are arranged circumferentially around the opposite sides of the base of the tire a series of links 9 one of which is shown in detail in Fig. 3. Each of the links is formed with a crescent shaped opening 10 in its opposite ends. The openings in ends of the links 9 are arranged in over-lapping arrangement as shown in Fig. 1 so that the crescent shaped openings 10 in the adjacent links will register. Passing through these openings is the hook shaped portion 11 of the link 12 shown in detail in Fig. 10. This link is formed with a bar shaped end 13 identical in structure with the bar shaped ends 6 and 6'. The bar 13 is passed through the opening 14 and the recessed portions 14' in the ends of the links or sections 4' and 4² and given a turn of 90° as indicated by the arrows 15. The links 9 can now be assembled on the hooks 11. This assembling operation is repeated around the tire. For the purpose of locking or connecting the end links 9 of each side together the perforated links 16 and the complemental links 17 are employed. The link 16 is formed with a series of perforations 18 and also the crescent shaped opening 10 similar to that in the links 9. The link 17 is formed with an outwardly projecting portion 19 having an opening 20 therein and also a crescent shaped opening 10 as shown in Fig. 6. The links 16 and 17 are assembled so that the hooks 11 pass through the openings 10 and the projection 19 passes through one of the perforations 18 in the link 16. When the series of links are drawn around the rim 3 in order to lock the links 16 and 17 a ring 21 or other suitable device is passed through the opening 20 of the link 17.

It will be seen from this construction that should one of the sections or transversely located members 4, 4', or 4² become broken that it may be readily replaced by inserting the bar shaped end 6 or 6' through one of the openings 8 or 14 and the hook 11 of the link 12 may be passed through the crescent shaped openings 10 of the links 9.

One of the advantages of the present construction is that the device may be assembled without the necessity of jacking up the car either in repairing or in placing the device on for the first time. By reason of the pyramid shape of the projections 5 it will be observed that the sections 4, 4', and 4² will prevent the wheel from skidding or revolving both transversely and circumferentially of the tread similar to the calk of the horse shoe.

It should be observed that the crescent shaped openings 10 will permit the tread sections 4, 4', and 4² to slightly move circumferentially of the tread portion of the tire when in use.

What I claim is:

1. In a device for the purpose described, a series of tread sections the opposite ends of which are formed respectively with key-hole shaped openings and outwardly extending bar shaped portions, said bar shaped portions being arranged transversely to the directions of the said openings whereby when the sections are assembled the bar-shaped portions may be inserted in place in the said openings of the sections by turning the sections relative to each other substantially 90°.

2. In a device for the purpose described, a series of tread sections the ends of which are formed with key-hole shaped openings and outwardly extending bar-shaped portions respectively, said bar shaped portions being arranged transversely to the said openings whereby when the sections are assembled the bar-shaped portions may be inserted in place in said openings of the sections by turning the same relative to each other substantially 90°, said sections each having a projection thereon for engaging the roadway.

3. In a device for the purpose described, the combination, of a series of laterally assembled links, means including openings and projections thereon for detachably connecting the same, a series of circumferentially arranged links having openings in their ends designed to register with each other when placed in overlapping positions and a series of links interposed between the first mentioned series and the circumferentially arranged overlapping series, the interposed links having hooks at one of their ends for engaging the registering openings in the circumferentially arranged links and laterally arranged outwardly projecting bar portions at their opposite ends for engaging the openings in the ends of the laterally arranged series of assembled links that are adjacent the series of the interposed links.

4. A link construction for the purpose described, comprising an end link having a crescent shaped opening in one of its ends and a projection at its other end, a second end link having a plurality of openings at one end and spaced from each other and in one of which openings the projection of the first mentioned end link may be placed, the second end link having a crescent shaped opening at the end which is opposite the end having the plurality of spaced openings, a plurality of connecting side links located between the two end links and each having a crescent shaped opening in each of its ends and designed to have the end openings placed in overlapping registering relation with each other, the crescent shaped openings adjacent the said ends of the first and second mentioned end links being also placed in registration with the crescent shaped openings of the end links of the connecting side links, means for securing the plurality of connecting side links together.

5. A link for a cross chain of a non-skid device comprising a body portion having an integral projection or stud extending outwardly therefrom, one end of the link having an opening formed with recessed portions and the other end of the link having an outwardly extending laterally arranged bar portion which is connected by a neck portion to the body portion whereby the bar portion may be inserted in the opening and recessed portions of the casing section 3 adjacent the disk plate rotated in the opening to bring the bar portion into a position which would extend across the opening in the adjacent link to connect two links together.

6. In a device for the purpose described, the combination, of a series of tread links transversely arranged of the tread portion of the tire, means for securing the same in place comprising a series of circumferentially disposed links located at the opposite sides of the tire, the side links having openings in their ends and designed to have their openings arranged in overlapping relation to each other for registration, intermediate links located between and attached to the outermost ends of the tread links and the intermediate links having hooks for entering the overlapping openings of the said side links for connecting the series of tread links to the said side links, said openings being crescent shaped to provide circumferential movement of the first series of links.

7. A connecting link for the purpose described, having a body portion with a hook at one end and a raised transversely disposed bar portion at its opposite end which is connected to the body portion by an angular shaped neck portion for permitting lateral rotation, when inserted in an opening as described, part of the neck portion being in the plane of the end of the link.

8. A link for the purpose described which is formed with a crescent shaped opening in each of its ends.

9. Complemental links for the purpose described, each link having an opening in one end, one being formed with perforations and the other with a perforated lug for entering one of the perforations for securing the same together and the perforation in the lug being for receiving a retaining device for securing the links together.

10. In a device for the purpose described, the combination, with the tread portion of a tire, of a series of laterally disposed detachable links which may be separated by turning them through an arc of 90°, each link having an opening in one end which extends longitudinally and a bar portion which extends laterally of the link for connecting the links together, and means arranged circumferentially of the tire for retaining the series of laterally disposed links in place.

DANIEL M. DRISCOLL.